United States Patent [19]

Dawdy

[11] 4,452,944

[45] Jun. 5, 1984

[54] STRUCTURAL ADHESIVE FORMULATIONS

[75] Inventor: Terrance H. Dawdy, Erie, Pa.

[73] Assignee: Lord Corporation, Erie, Pa.

[21] Appl. No.: 347,847

[22] Filed: Feb. 11, 1982

[51] Int. Cl.³ .......................... C08K 5/52; C08K 5/53; C08L 75/00
[52] U.S. Cl. .................................. 525/126; 525/255; 525/455; 524/139; 156/327; 156/332
[58] Field of Search ......................................... 525/126

[56] References Cited

U.S. PATENT DOCUMENTS 4,223,115  9/1980  Zalucha et al. .................... 525/126

Primary Examiner—John C. Bleutge
Assistant Examiner—A. L. Carrillo
Attorney, Agent, or Firm—John A. Gazewood

[57] ABSTRACT

Novel structural adhesives for bonding metals and plastics are disclosed. The adhesives, comprising a solution or dispersion of a polymeric material, a monomer which is copolymerizable with such polymeric material and phosphorous-containing compounds are characterized by improved performance at elevated temperatures and excellent resistance to thermal degradation.

20 Claims, No Drawings

STRUCTURAL ADHESIVE FORMULATIONS

FIELD OF THE INVENTION

Novel structural adhesives for bonding metals and plastics are disclosed. The adhesives, comprising a solution or dispersion of a polymeric material, a monomer which is copolymerizable with such polymeric material and phosphorous-containing compounds are characterized by improved performance at elevated temperatures and excellent resistance to thermal degradation.

The present invention relates to structural adhesive compositions. More particularly, the invention relates to improving adhesive performance at elevated temperatures and to improving resistance to thermal degradation.

Structural adhesive compositions are well-known articles of commerce which are extensively used commercially for bonding metal and plastic materials. The load-bearing and stress-relieving properties of structural adhesives, as well as their bond strength, which can exceed the strength of the engineering materials which are being bonded, make these adhesives attractive alternatives to or replacements for mechanical methods, such as riveting or spot welding, of joining engineering materials, especially where it is preferable to distribute load stresses over larger areas rather than to concentrate such stresses at a few points. Their use can reduce or eliminate costly finishing operations necessitated by mechanical joining methods, present a more pleasing exterior and at least reduce the possibility of corrosion of assemblies containing one or more metal components. Additionally, they can be used to bond a diversity of metals without extensive surface preparation. For example, Zalucha et al U.S. Pat. No. 4,223,115 and Briggs et al U.S. Pat. No. 3,890,407 disclose acrylic structural adhesive compositions which are effective bonding materials for oily metal surfaces.

Despite the attractiveness of acrylic structural adhesives, they are not without deficiency. For example, a burgeoning application area for such adhesives is in the bonding of lightweight metal and plastic materials in the transportation industry in the fabrication of vehicle bodies and component parts. In such applications, the final assembly is typically painted after the adhesive has been cured, preferably at ambient conditions of temperature, and the painted surfaces are exposed to a bake cycle at temperatures above 100° C. to augment setting and adhesion of the paint film. While the acrylic adhesives provide excellent bond characteristics at ambient conditions of temperature, it has been found that assemblies bonded with such adhesives, when exposed to elevated temperature bake cycles, suffer a significant loss of adhesive strength when tested at temperatures corresponding to those employed in the bake cycle and suffer a reduction in initial adhesion values when tested at ambient temperature following exposure to such elevated temperatures. Quite obviously, improvements in elevated temperature performance, without otherwise detracting from performance, would significantly enhance the use of acrylic structural adhesives.

In accordance with the present invention, acrylic structural adhesives having improved elevated temperature properties and improved resistance to thermal degradation have been discovered. More particularly, the novel acrylic structural adhesive compositions of the invention comprise, in combination, A. at least one polymeric material selected from the group consisting of
  (a) at least one olefinically unsaturated urethane reaction product of at least one isocyanate functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
  (b) at least one butadiene-based elastomeric polymeric material selected from the group consisting of
    (i) homopolymer of butadiene;
    (ii) copolymer of butadiene and at least one monomer copolymerizable therewith selected from the group consisting of styrene, acrylonitrile, methacrylonitrile and mixtures thereof;
    (iii) modified elastomeric polymeric material selected from the group consisting of butadiene homopolymer and copolymer as previously defined, such homopolymer and copolymer having been modified by copolymerization therein of trace amounts up to 5 percent by weight, based on weight of elastomeric material, of at least one functional monomer; and
    (iv) mixtures thereof; and
  (c) mixtures of such olefinically unsaturated urethane reaction product and such butadiene-based elastomeric polymeric material;
B. at least one polymerizable material selected from the group consisting of styrene and acrylic or substituted acrylic monomer, polymer of one or more such monomers, and partially polymerized syrup of one or more such monomers, such syrup containing both polymer and unpolymerized monomer, and mixtures thereof;
C. at least one phosphorous-containing compound; and
D. room temperature-active redox catalyst system.

The novel acrylic structural adhesive compositions of the invention are characterized by the substantial absence of free organic or inorganic acid compounds, especially methacrylic acid, except for the trace amount of carboxyl values which may be present in the modified butadiene-based elastomeric polymeric material and the phosphorous-containing compound. The exclusion of the acid compounds appears to provide improved high temperature performance with no apparent deleterious side effects; a result which is surprising, since it is known that the incorporation of acid compounds, especially methacrylic acid, in amounts up to 5–7 percent by weight is effective to improve metal adhesion and is effective to accelerate the curing of acrylic adhesives when the amount of acid which is included in the acrylic adhesive composition is in excess of 5–7 percent by weight.

More specifically, the room temperature-curable acrylic structural adhesive compositions of the invention comprise:

A. at least one polymeric material selected from the group consisting of:
  (a) at least one olefinically unsaturated urethane reaction product of at least one isocyanate functional prepolymer and at least one hydroxy-functional monomer having at least one unit of polymerizable olefinic unsaturation, such reaction product being characterized by the presence of at least two units of olefinic unsaturation and the substantial absence of free isocyanate groups;

(b) at least one butadiene-based elastomeric polymeric material selected from the group consisting of
   (i) homopolymer of butadiene;
   (ii) copolymer of butadiene and at least one monomer copolymerizable therewith selected from the group consisting of styrene, acrylonitrile, methacrylonitrile and mixtures thereof;
   (iii) modified elastomeric polymeric material selected from the group consisting of butadiene homopolymer and copolymer as previously defined, such homopolymer and copolymer having been modified by copolymerization therein of trace amounts up to 5 percent by weight, based on weight of elastomeric material, of at least one functional monomer; and
   (iv) mixtures thereof; and
(c) mixtures of such olefinically unsaturated urethane reaction product and such butadiene-based elastomeric polymeric material;

B. at least one polymerizable material selected from the group consisting of styrene and acrylic or substituted acrylic monomer, polymer of one or more such monomers, or partially polymerized syrup of one or more such monomers, such syrup containing both polymer and unpolymerized monomer, and mixtures thereof;

C. at least one phosphorous-containing compound;

D. at least one reducing agent of a room temperature-active redox couple catalyst system; and E. a bonding accelerator containing at least one oxidizing agent of a room temperature-active redox couple catalyst system, said oxidizing agent being reactive at room temperature with said reducing agent to produce free radicals effective to initiate polymerization of said addition-polymerizable polymeric material and said polymerizable olefinically unsaturated monomer, polymer of one or more such monomers or partially polymerized syrup of one or more such monomers, wherein the amount of such olefinically unsaturated urethane reaction product is in the range from 10 to 90, preferably 13 to 83, percent by weight, based on total weight of polymerizable materials and reducing agent; the amount of such butadiene-based elastomeric polymeric material is in the range from 1 to 30, preferably 7 to 27, percent by weight, based on total weight of polymerizable materials and reducing agent; the amount of such styrene and acrylic or substituted acrylic monomer, polymer of one or more such monomers, partially polymerized syrup of one or more such monomers or mixture thereof is in the range from 10 to 90, preferably 17 to 87, percent by weight, based on total weight of polymerizable materials and reducing agent; the amount of such phosphorous-containing compound is in the range from 0.1 to 20, preferably 2 to 10, percent by weight, based on total weight of polymerizable materials and reducing agent; the amount of such reducing agent is in the range from 0.05 to 10, preferably 0.1 to 6, percent by weight, based on total weight of polymerizable materials; and the amount of such oxidizing agent is in the range from 0.5 to 30, preferably 1 to 10, percent by weight, based on total weight of bonding accelerator;

such adhesive composition being characterized by the substantial absence of free organic and inorganic acid compounds, except for the trace amount of carboxyl values which may be interpolymerized in said modified butadiene-based elastomeric polymeric material and the acid values of the phosphorous-containing compound. The adhesive compositions of the invention can optionally contain up to 50, preferably not more than 25, percent by weight, based on total weight of polymerizable material and reducing agent, of at least one polymerizable olefinically unsaturated non-acrylic monomer; up to 60, preferably not more than 30 percent by weight, based on total weight of polymerizable material and reducing agent, of at least one polymerizable polymeric material haing an intrinsic viscosity in the range from 0.1 to 1.3, such polymeric material being obtained from the polymerization of at least one styrene monomer, acrylic monomer, substituted acrylic monomer, olefinically-unsaturated non-acrylic monomer or mixture thereof; and up to 40, preferably not more than 30, percent by weight, based on total weight or polymerizable material and reducing agent, of at least one addition-polymerizable elastomeric polymeric material having a second order glass transition temperature below 5° C.

A particularly preferred room temperature-curable acrylic adhesive of this invention consists essentially of A. as a polymerizable adhesive composition, a mixture of
   (a) from about 10 to about 90 percent by weight of at least one polymerizable material selected from the group consisting of styrene; methyl methacrylate; ethyl methacrylate; n-butyl methacrylate; isobutyl methacrylate; t-butyl methacrylate; hexyl methacrylate; ethyl-hexyl methacrylate; partially polymerized syrup of one or more of such monomers, such syrup containing both polymer and unpolymerized monomer; and mixtures thereof;
   (b) from about 10 to about 90, preferably about 13 to about 87, weight percent of at least one reaction product of isocyanate-functional prepolymer and hydroxy-functional monomer having at least one unit of polymerizable olefinic unsaturation, such reaction product being characterized by the substantial absence of free isocyanate groups;
   (c) from zero to about 20 weight percent of at least one polymerizable ethylenically unsaturated monomer, the amount of such monomer being in addition to the amount of any such monomer employed in (a);
   (d) from zero to about 40 weight percent of at least one elastomeric polymeric material having a second order glass transition temperature below about 5° C.;

the respective weight percents of (a), (b), (c) and (d) being based on the total weight of (a), (b), (c) and (d);
   (e) an effective amount of at least one phosphorous-containing compound;
   (f) an effective amount of at least one reducing agent; and B. As a bonding accelerator, an effective amount of at least one oxidizing agent, said oxidizing agent being reactive at room temperature with said reducing agent to generate free radicals effective to initiate addition polymerization of said polymerizable adhesive composition;

such adhesive composition being characterized by the substantial absence of free organic and inorganic acid compounds, except for traces up to 5 percent by weight of carboxyl values which may be present in said elastomeric polymeric material having a second order glass transition temperature below 5° C.

A second particularly preferred room temperature-curable acrylic adhesive of this invention consists essentially of AA. as a polymerizable adhesive composition, a mixture of
  (a) from about 1 to about 30 weight percent of at least one elastomeric polymeric material selected from the group consisting of polybutadiene homopolymer; a copolymer of butadiene and at least one monomer copolymerizable therewith selected from the group consisting of styrene, acrylonitrile and methacrylonitrile; modified polymeric material selected from the group consisting of polybutadiene homopolymer and copolymers of butadiene as previously set forth herein which have been modified by copolymerization therein of trace amounts of up to about 5 percent of a functional monomer; said polymeric material having a glass transition temperature below about 5° C.;
  (b) from about 25 to about 85 weight percent of at least one polymerizable acrylic or substituted acrylic monomer;
  (c) from zero to about 50 weight percent of at least one polymerizable olefinically unsaturated non-acrylic monomer;
  (d) from zero to about 60 weight percent of a polymer having an intrinsic viscosity in the range from about 0.1 to about 1.3 derived from at least one of said (b) and (c) monomers;
  the respective amounts of (a), (b), (c) and (d) being based on total combined weight of (a), (b), (c) and (d);
  (e) phosphorous-containing compound;
  (f) reducing agent; and
AB. as a bonding accelerator, an oxidizing agent, said oxidizing agent being reactive at room temperature with said reducing agent to generate free radicals effective to initiate addition polymerization of said polymerizable adhesive composition;
such adhesive composition being characterized by the substantial absence of free organic and inorganic acid compounds, except for traces up to 5 percent by weight of carboxyl values which may be present in said elastomeric polymeric material and the acid values of the phosphorous-containing compound.

Representative acrylic and substituted acrylic monomeric compounds which are suitable for use in the adhesive compositions of this invention include, without limitation thereto, methyl acrylate, butyl acrylate, isobutyl acrylate, 2-phenoxy acrylate, 2-methoxyethyl acrylate, 2-(N,N-diethylamino)-ethyl acrylate, 2-ethylhexyl acrylate; acrylonitrile, methyl acrylonitrile, neopentyl glycol diacrylate, ethylene glycol diacrylate, diethylene glycol diacrylate, hexylene glycol diacrylate, trimethylolpropane triacrylate; and the corresponding methacrylate compounds. It has been found that the use of polyfunctional acrylic and substituted acrylic monomeric compounds having at least two, preferably three or more, acrylic or substituted acrylic functional groups is effective in improving bond strength, heat resistance and resistance to thermal degradation. Such polyfunctional monomeric compounds are preferably employed in the range from 1 to 30, preferably 5 to 25, percent by weight, based on total amount of acrylic and substituted acrylic monomeric compounds. Polymers obtained from the polymerization of one or more of the monomeric acrylic and substituted acrylic compounds, such as poly(methyl methacrylate) and poly(methyl methacrylate-ethyl acrylate) and polymer-in-monomer syrups obtained from the partial polymerization of one or more monomeric acrylic and substituted acrylic compounds are also suitable for use in the practice of the invention. Such polymer-in-monomer syrups typically contain both polymer and unpolymerized monomer and can also contain neoprene. Polymer-in-monomer syrups, and methods of making such syrups, are well known and need not be discussed here in detail.

Polymerizable non-acrylic monomers, which are suitable for use in the practice of the invention include, without limitation thereto, styrene, vinyl styrene, chlorostyrene, vinyl acetate, and vinyl pyrolidone.

The isocyanate-functional prepolymers which are suitable for use in the practice of this invention are well known. Typically, such prepolymers are adducts or condensation products of polyisocyanate compounds having at least two free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least two free, unreacted isocyanate groups.

Polyols useful in preparing isocyanate-functional prepolymer used in the present invention preferably have an average molecular weight of about 300 to about 3,000. Suitable polyols include polyalkylene glycols such as polyethylene glycols; polyetherpolyols such as those prepared by addition polymerization of ethylene oxide and a polyol such as trimethylol propane in a ratio to provide unreacted hydroxyl groups in the product; organic hydroxylated elastomers exhibiting second order glass transition temperatures below about 5° C. such as poly(butadiene-styrene) polyols and poly(butadiene) polyols; polyester polyols such as are prepared by polymerizing polyols, such as diethylene glycol, trimethylol propane or 1,4-butanediol, with polycarboxylic acids, such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyesterpolyols such as are prepared by the polymeration of a lactone such as epsilon caprolactone.

Polyisocyanates which can be reacted with polyols to form isocyanate-functional prepolymers for use in the present invention can be any monomeric; that is, non-polymeric, isocyanate compound having at least two free isocyanate groups, including aliphatic, cycloaliphatic and aromatic compounds. Representative polyisocyanates include, without limitation thereto, 2,4-tolylene diisocyanate, 2,6-tolylene diisocyanate, 4,4'-diphenylmethane diisocyanate, m- and p-phenylene diisocyanate, polymethylene poly(phenyl isocyanate), hexamethylene diisocyante, 4,4'-methylene-bis(cyclohexyl isocyanate), isophorone diisocyanate, and other aliphatic cycloaliphatic and aromatic polyisocyanates, and including mixtures of such polyisocyanates. Currently, cycloaliphatic and aromatic polyisocyanates are preferred.

Hydroxy-functional compounds which can be employed to introduce olefinic unsaturation into the isocyanate-functional prepolymer include, without limitation, hydroxyethyl acrylate, hydroxyethyl methacrylate, allyl alcohol, and vinyl alcohol.

The butadiene-based elastomeric polymeric materials which are suitable for use in the practice of this invention are also well known and can be any elastomer derived from 1,3-butadiene or its halogenated analogs which has a glass transition temperature below ambient temperature and preferably not above about 5° C. Suitable elatomers include butadiene homopolymer, copolymers of butadiene with styrene, acrylonitrile and methacrylonitrile, and such homopolymers and copolymers modified by copolymerization therein of trace amounts (0.05 to 5%) of a functional comonomer, such as acrylic acid, methacrylic acid, maleic anhydride, fumaric acid, styrene and methyl methacrylate.

Elastomeric polymeric materials having second order glass transition temperatures below about 5° C. can be effective in modifying room temperature flexibility of the adhesive bond of the adhesive compositions of this invention, and are particularly beneficial in those adhesive compositions which contain olefinically unsaturated urethane reaction products. Especially preferred of such elastomers are polychloroprene rubber; polybutadiene rubber; butadiene copolymer rubbers such as acrylonitrile-butadiene, carboxylated acrylonitrile-butadiene and styrene-butadiene rubbers; polyacrylate rubbers such as poly(ethyl acrylate) and poly(ethyl acrylate-halogenated vinyl etheracrylic acid) rubbers; and ethylene copolymers such as ethylene-vinyl acetate rubbers. Other elastomeric polymers having a glass transition temperature below 5° C. can be employed since, other than the low glass transition temperature, there are no other limitations on the identity of the elastomer except for the specific requirements of the particular adhesive being formulated, such as suitable molecular weight, viscosity characteristics and compatibility with the other ingredients of the adhesive.

Polymeric materials having an intrinsic viscosity of 0.1 to about 1.3 which are suitable for use in the present invention can be obtained by the polymerization of one or more acrylic and nonacrylic monomers, including mixtures thereof. Exemplary polymeric materials include poly(methyl methacrylate/n-butylacrylate/ethyl acrylate) (90/5/5%); poly(n-butyl methacrylate/isobutyl methacrylate) (50/50%); poly(n-butyl methacrylate) and poly(ethyl methacrylate). Preferably, the viscosity will be about midway in the recited range. While such polymeric materials can be incorporated into any adhesives which are made in accordance with this invention, they are typically more beneficial in those adhesive compositions which contain butadiene-based elastomeric materials.

Phosphorous-containing compounds which are suitable for use in the adhesive compositions of this invention are selected from the group consisting of phosphoric acid and organic derivatives of phosphinic acid, phosphonic acid and phosphoric acid, said organic derivatives having at least one organic moiety characterized by the presence of at least one functional group, preferably terminally located. Such organic derivatives can be saturated or unsaturated, and preferably have at least one organic moiety characterized by the presence of at least one unit of olefinic unsaturation. More particularly, such phosphorous-containing compounds have the characteristic formulae:

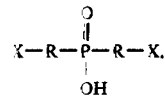

wherein each R is the same or different, and each R is independently a divalent organic radical directly bonded to the phosphorous atom through a carbon-phosphorous bond, said divalent radical being selected from the group consisting of divalent unsubstituted organic radical and divalent organic radical having at least one substituent group selected from the class consisting of halogen, hydroxyl, amino, alkyl radical containing from 1 to 8, preferably 1 to 4, carbon atoms and aryl radical having at least one moiety containing at least one aromatic nucleus; and wherein each X is the same or different, and each X is independently a functional group selected from the class consisting of hydrogen, hydroxyl, amino, mercapto, halogen and $CH_2=C<$;

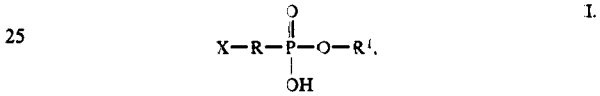

wherein R and X are as previously defined; and $R^1$ is hydrogen or $-R^2-X$, wherein $R^2$ is a divalent organic radical directly bonded to the oxygen radical through a carbon-oxygen bond, said divalent radical $R^2$ being selected from the group consisting of divalent unsubstituted organic radical and divalent organic radical having at least one substituent group selected from the class consisting of halogen, hydroxyl, amino, alkyl radical containing from 1 to 8, preferably 1 to 4, carbon atoms and aryl radical having at least one moiety containing at least one aromatic nucleus and X is as previously defined; and

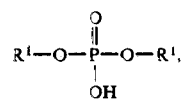

wherein $R^1$ is as previously described.

A currently preferred group of phosphorous-containing compound has the formula

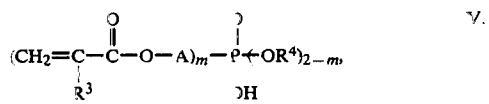

wherein $R^3$ is selected from the group consisting of hydrogen, halogen, an alkyl group having from 1 to 8, preferably 1 to 4, carbon atoms, and $CH_2=CH-$; $R^4$ is selected from the group consisting of hydrogen, an alkyl group having from 1 to 8, preferably 1 to 4 carbon atoms, and a haloalkyl group having 1 to 8, preferably 1 to 4, carbon atoms; A is selected from the group consisting of $-R^5O-$ and $(R^6O)_n$, wherein $R^5$ is an aliphatic or cycloaliphatic alkylene group containing from 1 to 9 preferably 2 to 6, carbon atoms; $R^6$ is an alkylene group having from 1 to 7, preferably 2 to 4, carbon atoms; n is an integer from 2 to 10, and m is 1 or 2, preferably 1.

In the several formulae I–IV, the divalent organic radicals R and $R^2$ can have a compound structure; that is, the radical can contain at least one, or a series of at least two, unsubstituted or substituted hydrocarbon group(s) containing or separated from each other by —O—, —S—, —COO—, —NH—, —NHCOO—, and $(R^7O)_p$, wherein $R^7$ is an alkylene group containing from 2 to 7, preferably 2 to 4 carbon atoms, and p is an integer from 2 to 10. Preferably, the divalent radical is an alkylene radical having a straight chain or ring of from 1 to 22, preferably 1 to 9, carbon atoms in any nonrepeating unit. It will be understood that divalent radicals having a compound structure would have 2 or more of such straight chains or rings. The divalent radicals can be saturated or unsaturated; aliphatic, cycloaliphatic or aromatic; and, with compound structures, can include mixtures thereof; and generally have from 1 to about 22 carbon atoms in each chain or ring of carbon atoms.

In the several formulae I–III, representative X—R— and X—$R^2$— radicals include, without limitation thereto, lower alkenyl, cyclohexenyl, hydroxy-lower alkenyl, halo-lower alkenyl, carboxy-lower alkenyl, lower alkyl, amino-lower alkyl, hydroxy-lower alkyl, mercapto-lower alkyl, alkoxy-lower alkyl, halo-lower alkyl, di-phosphonomethyl-amino-lower alkyl, phenyl-hydroxy-phosphonomethyl, aminophenyl-hydroxy-phosphonomethyl, halophenyl-hydroxy-phosphonomethyl, phenyl-amino-phosphonomethyl, halophenyl-amino-phosphonomethyl, hydroxy-phosphonomethyl, lower alkyl-hydroxy-phosphonomethyl, halo-lower alkyl-hydroxy-phosphonomethyl and amino-lower alkyl-hydroxy-phosphonomethyl; the term "lower" referring to a group containing from 1 to 8, preferably 1 to 4, carbon atoms.

Phosphorous-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorous-containing compounds include, without limitation, phosphoric acid; 2-methacryloyl oxyethyl phosphate; bis-(2-methacryloyloxyethyl) phosphate; 2-acryloyloxyethyl phosphate; bis-(2-acryloyloxyethyl) phosphate; methyl-(2-methacryloyloxyethyl) phosphate; ethyl methacryloyloxyethyl phosphate; methyl acryloyloxyethyl phosphate; ethyl acryloyloxyethyl phosphate; compounds of Formula IV wherein $R^3$ is hydrogen or methyl and $R^4$ is propyl, isobutyl, ethylhexyl, halopropyl, haloisobutyl or haloethylhexyl; vinyl phosphonic acid; cyclohexene-3-phosphonic acid; alphahydroxybutene-2-phosphonic acid; 1-hydroxy-1-phenylmethane-1,1-diphosphonic acid; 1-hydroxy-1-methyl-1,1-diphosphonic acid; 1-amino-1-phenyl-1,1-diphosphonic acid; 3-amino-1-hydroxypropane-1,1-diphosphonic acid; amino-tris(methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; bis(β-methacryloyloxyethyl) phosphinic acid and allyl methacryloyloxyethyl phosphinic acid.

The room temperature-reactive redox couple catalyst systems which are employed in the adhesive systems of this invention are wellknown and need not be discussed herein in detail. Basically, such systems comprise at least one oxidizing agent and at least one reducing agent which are coreactive at room temperature to generate free radicals effective in the present invention, to initiate addition polymerization reactions. Substantially any of the known oxidizing and reducing agents which are so coreactive can be employed in the practice of the present invention. Representative oxidizing agents include, without limitation, organic peroxides such as benzoyl peroxide and other diacyl peroxides, hydroperoxides such as cumene hydroperoxide, peresters such as t-butylperoxybenzoate; ketone hydroperoxides such as methyl ethyl ketone, organic salts of transition metals such as cobalt naphthenate, and compounds containing a labile chlorine such as sulfonyl chloride. Representative reducing agents include, without limitation, sulfinic acids, and their inorganic salts; azo compounds such as azoisobutyric acid dinitrile; alpha-aminosulfones such as bis(tolylsulfonmethyl) amine, bis-(tolylsulfonmethyl) ethyl amine and bis-(tolylsulfonmethyl)-benzyl amine; tertiary amines such as diisopropyl-p-toluidine, dimethyl aniline and dimethyl-p-toluidine; and amine-aldehyde condensation products, for example, the condensation products of aliphatic aldehydes such as butyraldehyde with primary amines such as aniline or butylamine. The use of known accelerators and promoters with the redox couple catalyst systems can be advantageous.

Because the adhesive systems are curable at room temperature, they are typically provided as two-part systems, with the oxidizing agent preferably separated from the part containing the olefinically unsaturated urethane reaction produce and/or butadiene-based elastomeric polymeric material. In most cases, the phosphorous-containing compound will be dissolved or dispersed in the part containing the olefinically unsaturated urethane reaction product and/or butadiene-based elastomeric polymeric material. This latter part preferably contains the reducing agent of the redox couple catalyst system. However, in some cases, it is beneficial to incorporate the phosphorous-containing compound into the part containing the oxidizing agent. In all cases, the part containing the oxidizing agent, regardless of the presence or absence of phosphorous-containing compound, contains a carrier vehicle which is capable of maintaining the oxidizing agent, and phosphorous-containing compound, when present, as a stable solution or dispersion.

The carrier vehicles which are suitable for use in the bonding activators of the present invention can be a simple inert solvent or diluent such as methylene chloride, or butyl benzyl phthalate, including mixtures of such solvents or diluents. The carrier vehicle should contain not more than 5% by weight of any moiety which is reactive with the oxidizing agent at room temperature. The carrier vehicle can be a more complex mixture including at least one film-forming binder in addition to inert solvent or diluent. In this case, the film-forming binder is preferably substantially inert with respect to the oxidant which is present in the primer composition. A particularly preferred carrier vehicle comprising at least one film-forming binder is an admixture comprising about 0.05 to about 50 percent by weight of, (1), at least one standard organic polymeric film-forming binder having a glass transition temperature in the range from about 0° C. to about 150° C. or, (2), at least one polymer-in-monomer syrup as described herein; and from about 40 to about 99 percent by weight of at least one organic solvent capable of maintaining the film-forming binder, phosphorous-containing compound when incorporated into the bonding activator composition, and oxidizing agent as a stable solution or dispersion. Among the polymeric film-forming binder materials which can be employed in the carrier vehicle are, without limitation, polyalkylacrylates and methacrylates and copolymers thereof, polystyrene and copolymers thereof, vinyl polymers and copolymers, polyesters, polyketones, polysulfones, phenolic resins, polyvinyl butyrals, and polycarbonates. The carrier vehicle can contain, in addition to solvent or solvent and film-forming binder, additives such as external plasticizers, flexibilizers, suspenders, and stabilizers, providing that any such additives do not unacceptably adversely affect the stability of the activator compositions.

The use of from 0.01 to 10, preferably 0.5 to 5, percent by weight of polymerizable adhesive materials of certain tertiary amines having the formula

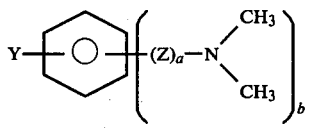

wherein Z is methylene; Y is selected from the group consisting of hydrogen, hydroxy, amino, halogen, alkyl of 1 to 8, preferably 1 to 4, carbon atoms, and alkoxy having from 1 to 8, preferably 1 to 4, carbon atoms; a is zero, or 1; and b is 1 or 2; is effective to accelerate the room temperature cure of the herein described adhesive compositions. Especially preferred tertiary amine cure accelerators are N,N-dimethylaniline and N,N-dimethylaminomethylphenol.

The environmental resistance of the herein described adhesive systems can be improved by the addition of from about 0.005 to about 15, preferably about 0.1 to about 10, percent by weight, based on total weight of polymerizable adhesive composition of a mixture of a metal molybdate selected from the group consisting of zinc molybdate, calcium molybdate, barium molybdate, strontium molybdate and mixtures thereof, and a metal phosphate selected from the group consisting of zinc phosphate, calcium phosphate, magnesium phosphate and mixtures thereof, said metal molybdate being present on a volume concentration basis of from about 2 to about 3 parts per part of said metal phosphate. Such mixtures, including their preparation, are more fully described in U.S. Pat. No. 4,017,315, the disclosure of which is incorporated herein by reference.

Polybasic lead salts of phosphoric acid and saturated and unsaturated organic dicarboxylic acids and acid anhydrides particularly dibasic lead phthalate, monohydrous tribasic lead maleate, tetrabasic lead fumarate, dibasic lead phosphite and mixtures thereof; and zinc oxide, in an amount in the range from about 0.1 to about 15, preferably about 1 to about 10, percent by weight, based on total weight of polymerizable adhesive composition, are also effective in improving environmental resistance.

Other additives conventionally employed in adhesive compositions, such as fillers, pigments and the like can be added to the herein-described adhesive systems. The incorporation of comminuted reinforcing fibers, such as chopped or milled fiber glass, carbon fibers, boron fibers and aromid fibers, in particular, has been found to be effective in improving bond strength, heat resistance and resistance to thermal degradation.

The base adhesive compositions, bonding accelerators and adhesive primer compositions are prepared by conventional methods, such as are disclosed, for example, in U.S. Pat. No. 3,832,274 and U.S. Pat. No. 3,890,407.

The adhesive systems of the present invention may be used to bond metal surfaces, such as steel, aluminum and copper, to a variety of substrates; including metals, plastics and other polymers, fibers, glass, ceramics, wood and the like. The adhesive systems can be employed as multipack adhesive systems where one part contains the polymerizable adhesive composition and a second part contains the herein-described bonding accelerators. Alternatively, the bonding accelerator can be employed as a primer system. When used as a multipart system, one or both surfaces to be joined are coated with the adhesive system obtained by mixing the individual parts, and the surfaces are placed in contact with each other. In the primer system, the primer composition or bonding activator is first applied to one or both of the surfaces to be joined, and the adhesive resin mass containing polymerizable adhesive composition is applied to at least one of the surfaces, which are then placed in contact with each other. In the general case, the primer system is operationally more convenient.

It is a particular feature of the present invention that the herein-described adhesive compositions can be employed to bond metal substrates such as steel, aluminum and copper with little, if any, pretreatment of the metal surface prior to application of the primer or adhesive, as the case may be. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing. They can also be employed on porous substrates, unlike the anaerobic adhesives which require the exclusion of air and thus cannot be used on surfaces containing air in their pores.

The invention is illustrated by the following examples, wherein all parts, proportions and percentages are by weight unless otherwise indicated.

EXAMPLE I

An adhesive resin, hereinafter identified as AR-I, was prepared by reacting 1.0 mole of polycaprolactone triol having an average molecular weight of 54.0, 0.65 mole of polycaprolactone diol having an average molecular weight of 2000 and 4.3 moles of toluene diisocyanate in the presence of a catalytic amount of dibutyltin dilaurate and methyl methacrylate diluent until all hydroxy groups had been reacted, yielding isocyanate-functional urethane prepolymer dissolved in methyl methacrylate diluent. To the reaction was added 4.3 moles of hydroxyethyl acrylate and the reaction continued until all isocyanate moieties had been reacted, yielding acrylated polyurethane resin AR-I at 65% resin solids in methyl methacrylate (MMA) monomer diluent.

EXAMPLE II

Adhesive systems were prepared in a conventional manner having the following compositions (amounts are in parts by weight):

| Adhesive Composition | II-1 | II-2 |
|---|---|---|
| AR-I (Ex.I) (65% AR-I in MMA) | 23.8 | 23.8 |
| Carboxylated poly (1,3-butadiene/acrylonitrile) elastomer | 11.4 | 11.4 |
| 2-Methacryloyloxyethyl phosphate | 4.2 | 4.2 |
| Methacrylic acid | 7.6 | 0.0 |
| Methyl methacrylate | 41.6 | 41.6 |
| Calcium molybdate (3 vol)/zinc phosphate (2 vol) | 4.3 | 4.3 |
| Dimethylaniline | 1.8 | 1.8 |
| Diisopropanol-p-toluidine | 1.3 | 1.3 |
| Silica | 5.0 | 5.0 |

After blending the ingredients to obtain homogeneous compositions, the adhesives were used for steel-steel (SAE 1010 cold-rolled steel) metal bonding. The fully-mixed adhesives were coated onto one mating surface and a second uncoated mating surface was pressed onto the adhesive to complete the test assemblies. The total glueline thickness was approximately 20 mils for each test assembly. The test pieces were cured at room temperature for 12 hours and one-half of the pieces were subsequently given a postbake at 204° C. for 30 minutes. Lap shear tests were performed at room temperature and at 204° C. on the cured assemblies according to the procedure of ASTM D-1002-72. The test results, in megapascals, are reported in Table II.

TABLE II

| Adhesive | II-1 | II-2 |
|---|---|---|
| Lap Shear, @ RT, no postbake | 31.1 | 34.5 |
| Lap Shear @ RT, after postbake | 9.7* | 33.1** |
| Lap Shear @ 204° C., after postbake | 0.07 | 0.07 |

*severe gassing
**no gassing

The data clearly demonstrate the improvement in bond strength and in resistance to thermal degradation when the adhesive system contains no acid, specifically methacrylic acid, other than the acid values present in the carboxylated butadiene-acrylonitrile elastomeric polymeric material.

EXAMPLE III

The adhesive compositions II-1 and II-2 of Example II were used to prepare the following adhesive formulations:

| Formulation | III-1 | III-2 | III-3 | III-4 | III-4 |
|---|---|---|---|---|---|
| Adhesive II-1 (Ex.II) | 100 | — | — | — | — |
| Adhesive II-2 (Ex.II) | — | 100 | 100 | 100 | 100 |
| Milled fiber glass | — | — | 20 | 50 | 100 |

Adhesives II-1 and II-2 of Example II with no reinforcing filler were used as a control. Each of the adhesives was employed following the procedure of Example II to bond commercial quality 1010 cold-rolled steel. Lap shear tests at room temperature and 204° F. were performed according to the procedure of Example II. The test reports, in megapascals, are reported in Table III.

TABLE III

| Adhesive | III-1 | III-2 | III-3 | III-4 | III-5 |
|---|---|---|---|---|---|
| Lap shear at RT, no postbake | 19.1 | 14.6 | 22.9 | 22.5 | 15.7 |
| Lap shear at RT, after postbake | 9.2 | 16.1 | 14.4 | 16.7 | 14.1 |
| Lap shear at 204° C., after postbake | 0.12 | 0.04 | 0.13 | 0.26 | 0.23 |

The data demonstrate that the incorporation of reinforcing fillers into the adhesive compositions of the invention can be effective in improving elevated temperature performance.

EXAMPLE IV

The adhesive compositions II-1 and II-2 of Example II were used to prepare the following adhesive formulations:

| Formulation | IV-1 | IV-2 | IV-3 | IV-4 | IV-5 | IV-6 | IV-7 | IV-8 | IV-9 |
|---|---|---|---|---|---|---|---|---|---|
| Adhesive II-1 (Ex.II) | 100 | — | — | — | — | — | — | — | — |
| Adhesive II-1 (Ex.II) | — | 100 | 100 | 100 | 100 | 100 | 100 | 100 | 100 |
| Milled fiber glass | — | — | — | 20 | — | 20 | 100 | 100 | 100 |
| Trimethylolpropane triacrylate | — | — | 6 | 6 | 12 | 12 | 2 | 4 | 7 |

The adhesives II-1 and II-2 of Example II were used as controls. Each of the adhesives were employed to bond commercial quality cold-rolled steel and SAE 1010 cold-rolled steel, following the procedure of Example II. Lap shear tests at room temperature and 204° C. were performed according to the procedure of Example II, with the results being reported in Table IV.

TABLE IV

| Adhesive | Cold Rolled Steel, Grade | Lap Shear RT, No Postbake | Strength, RT, With Postbake | Mega Pascals 204° C., With Postbake |
|---|---|---|---|---|
| 1 | Commercial | 19.0 | 9.2 | 0.12 |
| 2 | " | 14.6 | 16.1 | 0.04 |
| 3 | " | 13.6 | 18.2 | 0.77 |
| 4 | " | 16.0 | 20.7 | 0.88 |
| 5 | " | 13.4 | 16.0 | 0.51 |
| 6 | " | 13.4 | 17.7 | 0.95 |
| 7 | " | 17.9 | 15.7 | 0.49 |
| 8 | " | 18.9 | 15.2 | 0.44 |
| 9 | " | 18.8 | 14.8 | 0.88 |
| 1 | SAE | — | — | — |
| 2 | " | — | — | — |
| 3 | " | 28.9 | 23.2 | 0.62 |
| 4 | " | 26.8 | 22.0 | 0.97 |
| 5 | " | 26.4 | 22.0 | 1.08 |
| 6 | " | 26.4 | 23.5 | 1.07 |
| 7 | " | — | — | — |
| 8 | " | — | — | — |
| 9 | " | — | — | — |

The data further confirms the significant improvement in resisance to thermal degradation afforded by the acrylic structural adhesives of the invention. The data demonstrate that the use of polyacrylates having at least two acrylic functional groups not only significantly improves resistance to thermal degradation but also significantly improves adhesion at elevated temperatures.

EXAMPLE V

The following two-part primer composition was prepared, amounts are in parts by weight.

| Ingredient | Part A | Part B |
|---|---|---|
| Polymethylene poly-(phenyl isocyanate) | 16.0 | — |
| Hexakismethoxy-melamine amino resin | — | 1.0 |
| Dibutyltin dilaurate | — | 0.15 |
| Methylene chloride | 84.0 | 98.85 |

The following acrylic structural adhesives were prepared, amounts are in parts by weight:

| Formulation | V-1 | V-2 | V-3 |
|---|---|---|---|
| Adhesive II-1 (Ex.II) | 100 | — | — |
| Adhesive II-2 (Ex.II) | — | 100 | 100 |
| Silica | — | 5 | 5 |
| Trimethylolpropane triacrylate | — | 6 | 12 |
| Milled fiber glass | — | 20 | — |

The individual parts A and B of the primer compositions were mixed and applied to polyester-based fiberglass reinforced plastic stock. The plastic stock was coated with an 0.1 mil wet film thickness of primer, which was allowed to dry for 30 minutes at ambient conditions of temperature and humidity. The primed plastic stock was bonded to commercial quality cold-rolled steel parts which had been coated with a 20 mil thickness with one of adhesives V-1, V-2 and V-3. The plastic-steel assemblies were bonded and tested according to the procedure of Example II, except that the postbake temperature was 138° C. The results are reported in Table V.

TABLE V

| Adhesive | V-1 | V-2 | V-3 |
|---|---|---|---|
| Lap shear @ RT, no postbake | 6.6 | 6.8 | 7.3 |
| Lap shear @ RT, after postbake | 5.2 | 6.7 | 5.7 |
| Lap shear @ 204° C., after postbake | 0.05 | 0.08 | 0.08 |

The data demonstrate the improvement in elevated temperature performance and resistance to thermal degradation of the adhesive of the invention in plastic-metal bonding applications.

EXAMPLE VI

Equivalent results were obtained, that is, significant improvement in elevated temperature performance and improved resistance to thermal degradation, in bonding galvanized steel, aluminum and unprimed plastic materials.

What is claimed is:

1. A room temperature-curable adhesive system comprising
   A. as a polymerizable adhesive composition, a mixture of
   (a) from about 10 to about 90 percent by weight of at least one polymerizable material selected from the group consisting of styrene, methyl methacrylate, ethyl methacrylate, n-butyl methacrylate, isobutyl methacrylate, t-butyl methacrylate, hexyl methacrylate, ethylhexyl methacrylate, partially polymerized syrup of one or more of such monomers, such syrup containing both polymer and unpolymerized monomer, and mixtures thereof;
   (b) from about 10 to 90 percent by weight of at least one reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate group;
   (c) from zero to about 20 percent by weight of at least one polymerizable olefinically unsaturated monomer, the amount of said monomer being in addition to the amount of any such monomer employed in (A) (a);
   (d) from zero to about 40 percent by weight of at least one elastomeric polymeric material having a second order glass transition temperature below about 5°;
   the respective percentages of (a)–(d) being based on the total weight of (a)–(d);
   (e) an effective amount of at least one phosphorous-containing compound having the formulae

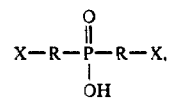

wherein each R is the same or different, and each R is independently a divalent organic radical directly bonded to the phosphorous atom through a carbon-phosphorous bond, said divalent radical being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus; and wherein each X is the same or different, and each X is independently a functional group selected from the class consisting of hydrogen, hydroxyl, amino, mercapto, halogen and CH=C<;

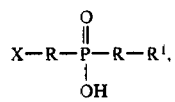

wherein R and X are as previously defined; and $R^1$ is hydrogen or $-R^2-X$, wherein $R^2$ is a divalent organic radical directly bonded to the oxygen radical through a carbon-oxygen bond, said divalent readical $R^2$ being selected from the group having at least one substitutent group selected from the class consisting of halogen, hydroxyl, amino, alkyl radical containing from 1 to 8 carbon atoms and aryl radical having at least one moiety containing at least one aromatic nucleus and X is as previously defined; and

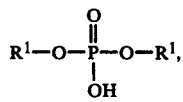

wherein $R^1$ is as previously described;

(f) an effective amount of at least one reducing agent;

(g) from zero to about 10 percent by weight of polymerizable adhesive composition of at least one tertiary amine having the formula

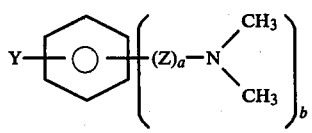

wherein Z is methylene; Y is selected from the group consisting of hydrogen, hydroxy, amino, halogen, alkyl radical having from 1 to 8 carbon atoms, and alkoxy radicals wherein the alkyl moiety has from 1 to 8 carbon atoms; a is zero or 1; and b is 1 or 2;

(h) from zero to about 15 percent by weight of polymerizable adhesive composition of a mixture of a metal molybdate selected from the group consisting of zinc molybdate, calcium molybdate, barium molybdate, strontium molybdate and mixtures thereof and a metal phosphate selected from the group consisting of zinc phosphate, calcium phosphate, magnesium phosphate and mixtures thereof; said metal molybdate being present on a volume concentration basis of from about 2 to about 3 parts per part of said metal phosphate; and (i) from zero to about 15 percent by weight of polymerizable adhesive composition of at least one compound selected from the group consisting of polybasic lead salts of phosphorous acid, polybasic lead salts of saturated organic dicarboxylic acids and acid anhydrides, polybasic lead salts of unsaturated organic dicarboxylic acids and acid anhydrides, zinc oxide, and mixtures thereof;

the percentage of (a)-(d) being 100 minus the combined percentages of (e)-(i); and B. as a bonding accelerator an effective amount of at least one oxidizing agent, said oxidizing agent being reactive at room temperature with said reducing agent to generate free radicals effective to initiate addition polymerization of said polymerizable adhesive composition;

said polymerizable adhesive composition being characterized by the substantial absence of free organic and inorganic acid compounds, except for the phosphorus-containing compound.

2. An adhesive system according to claim 1 wherein said phosphorous-containing compound is present in an amount in the range from about 0.1 to about 20 percent by weight, of polymerizable adhesive composition; said reducing agent is present in an amount in the range from about 0.05 to about 10 percent by weight of polymerizable adhesive composition; said oxidizing agent is present in an amount in the range from about 0.5 to about 30 percent by weight of bonding accelerator; and said bonding accelerator contains from about 40 to about 99.5 percent by weight of a carrier vehicle comprising at least one inert organic diluent, said carrier vehicle being capable of maintaining said oxidizing agent as a stable solution or dispersion.

3. An adhesive system according to claim 2 wherein said tertiary amine having the formula (V) is present in an amount in the range from about 0.01 to about 10 percent by weight.

4. An adhesive system according to claim 2 wherein said bonding accelerator contains from about 0.05 to about 50 percent by weight of at least one organic polymeric film-forming binder material selected from the group consisting of saturated organic polymeric composition having a glass transition temperature in the range from about 0° C. to about 150° C. and polymer-in-monomer syrup, said polymer-in-monomer syrup consisting essentially of (i) from about 2 to about 60 percent by weight of at least one addition polymer;

(ii) from about 10 to about 98 percent by weight of at least one polymerizable olefinically unsaturated compound having at least one $>C=C<$ group; and (iii) from zero to about 30 percent by weight of a polymer containing the group $(CH_2CCl=CH-CH_2)_n$, wherein n is an integer;

wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weight of (i), (ii) and (iii); said carrier vehicle being capable of maintaining said oxidizing agent and said film-forming binder material as a stable solution or dispersion.

5. An adhesive system according to claim 4 wherein said tertiary amine having the formula (V) is present in an amount in the range from about 0.01 to about 10 percent by weight.

6. An adhesive system according to claim 1 wherein said phosphorous-containing compound has the formula

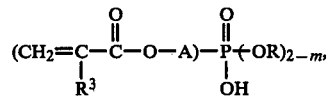

wherein $R^3$ is selected from the group consisting of hydrogen, halogen, an alkyl group having from 1 to 8 carbon atoms, and $CH_2=CH-$; $R^4$ is selected from the group consisting of hydrogen, an alkyl group having from 1 to 8 carbon atoms, and a haloalkyl group having 1 to 8 carbon atoms; A is selected from the group consisting of $-R^5O-$ and $(R^6O)_n$, wherein $R^5$ is an aliphatic or cycloaliphatic alkylene group containing from 1 to 9 carbon atoms; $R^6$ is an alkylene group having from 1 to 7 carbon atoms; n is an integer from 2 to 10, and m is 1 or 2.

7. An adhesive system according to claim 6 wherein said phosphorous-containing compound is present in an amount in the range from about 0.1 to about 20 percent by weight of polymerizable adhesive composition, said reducing agent is present in an amount in the range from about 0.05 to about 10 percent by weight of polymerizable adhesive composition; said oxidizing agent is present in an amount in the range from about 0.5 to about 30 percent by weight of bonding accelerator; and said bonding accelerator contains from about 10 to about 99.5 percent by weight of bonding accelerator of a carrier vehicle comprising at least one inert organic diluent, said carrier vehicle being capable of maintaining said oxidizing agent as a stable solution or dispersion.

8. An adhesive system according to claim 7 wherein said tertiary amine having the formula (V) is present in an amount in the range from about 0.01 to about 10 percent by weight.

9. An adhesive system according to claim 6 wherein said bonding accelerator contains from about 0.05 to about 50 percent by weight of at least one organic polymeric film-forming binder material selected from the group consisting of saturated organic polymer composition having a glass transition temperature in the range from about 0° C. to about 150° C. and polymer-in-monomer syrup, said polymer-in-monomer syrup consisting essentially of
 (i) from about 2 to about 60 percent by weight of at least one addition polymer;
 (ii) from about 10 to about 98 percent by weight of at least one polymerizable olefinically unsaturated compound having at least one $>C=C<$ group; and
 (iii) from zero to about 30 percent by weight of a polymer containing the group $(CH_2CCl=CH-CH_2)_n$, wherein n is an integer;
wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weight of (i), (ii) and (iii); said carrier vehicle being capable of maintaining said oxidizingagent and said film-forming binder material as a stable solution or dispersion.

10. An adhesive system according to claim 9 wherein said tertiary amine having the formula (V) is present in an amount in the range from about 0.01 to about 10 percent by weight.

11. A room temperature-curable adhesive system comprising
A. as a polymerizable adhesive composition, a mixture of
 (a) from about 10 to about 90 percent by weight of at least one polymerizable material selected from the group consisting of styrene, methyl methacrylate, ethyl methacrylate, n-butyl methacrylate, isobutyl methacrylate, t-butyl-methacrylate, hexyl methacrylate, ethylhexyl methacrylate, partially polymerized syrup of one or more of such monomers, such syrup containing both polymer and unpolymerized monomer, and mixtures thereof;
 (b) from about 10 to about 90 percent by weight of at least one reaction product of at least one isocyanate-functional prepolymer and at least one hydroxy-functional monomer having at least one unit of polymerizable olefinic unsaturation, such reaction product being characterized by the presence of at least two units of olefinic unsaturation and the substantial absence of free isocyanate group;
 (c) from zero to about 20 percent by weight of at least one polymerizable olefinically unsaturated monomer, the amount of said monomer being in addition to the amount of any such monomer employed in (A) (a);
 (d) from zero to about 40 percent by weight of at least one elastomeric polymeric material having a second order glass transition temperature below about 5° C.;
 the respective percentages of (a)–(d) being based on the total weight of (a)–(d);
 (e) an effective amount of at least one reducing agent;
 (f) from zero to about 15 percent by weight of polymerizable adhesive composition of a mixture of a metal molybdate selected from the group consisting of zinc molybdate, calcium molybdate, barium molybdate, strontium molybdate and mixtures thereof and a metal phosphate selected from the group consisting of zinc phosphate, calcium phosphate, magnesium phosphate and mixtures thereof; said metal molybdate being present on a volume concentration basis of from about 2 to about 3 parts per part of said metal phosphate; and
 (g) from zero to about 15 percent by weight of polymerizable adhesive composition of at least one compound selected from the group consisting of polybasic lead salts of phosphorous acid, polybasic lead salts of saturated organic dicarboxylic acids and acid anhydrides, polybasic lead salts of unsaturated organic dicarboxylic acids and acid anhydrides, zinc oxide, and mixtures thereof; and
 the amount of (a)–(d), in percent by weight, being 100 minus the combined amount in total percent by weight (e)–(g); and
B. as a bonding accelerator, an admixture comprising
 (a) from about 0.5 to about 30 percent by weight of at least one oxidizing agent; said oxidizing agent being reactive at room temperature with said reducing agent to generate free radicals effective to initiate addition polymerization of said polymerizable adhesive compositions;
 (b) from about 0.1 to about 20 percent by weight of at least one phosphorous-containing compound having the formulae

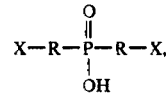

wherein each R is the same or different, and each R is independently a divalent organic radical directly bonded to the phosphosous atom through a carbon-phosphorous bond, said divalent radical being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus; and wherein each X is the same or different, and each X is independently a functional group selected from the class consisting of hydrogen, hydroxyl, amino, mercapto, halogen and $CH_2=C<$;

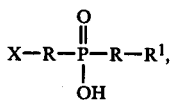
II.

wherein R and X are as previously defined; and $R^1$ is hydrogen or $-R^2-X$, wherein $R^2$ is a divalent organic radical directly bonded to the oxygen radical through a carbon-oxygen bond, said divalent radical $R^2$ being selected from the group consisting of divalent unsubstituted group selected from the class consisting of halogen, hydroxyl, amino, alkyl radical containing from 1 to 8 carbon atoms and aryl radical having at least one moiety containing at least one aromatic nucleus and X is as previously defined; and

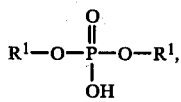

wherein $R^1$ is as previously described;
(c) from zero to about 5 percent by weight of at least one free radical scavenger; and
(d) from about 40 to about 99 percent by weight of a carrier vehicle comprising at least one inert organic diluent, said carrier vehicle being capable of maintaining said oxidizing agent and said phosphorous-containing compound as a stable solution or dispersion;
said polymerizable adhesive composition being characterized by the substantial absence of free organic and inorganic acid compounds, except for the phosphorus-containing compound.

12. An adhesive system according to claim 11 wherein said reducing agent is present in an amount in the range from about 0.05 to about 10 percent by weight of polymerizable adhesive composition.

13. An adhesive system according to claim 11 wherein said phosphorous-containing compound has the formula

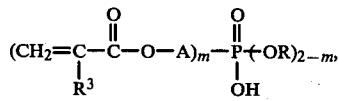
IV.

wherein $R^3$ is selected from the group consisting of hydrogen, halogen, an alkyl group having from 1 to 8 carbon atoms, and $CH_2=CH-$; $R^4$ is selected from the group consisting of hydrogen, an alkyl group having from 1 to 8 carbon atoms, and a haloalkyl group having 1 to 8 carbon atoms; A is selected from the group consisting of $-R^5 O-$ and $(R^6O)_n$, wherein R is an aliphatic or cycloaliphatic alkylene group containing from 1 to 9 carbon atoms; $R^6$ is an alkylene group having from 1 to 7 carbon atoms; n is an integer from 2 to 10, and m is 1 or 2.

14. An adhesive system according to claim 13 wherein said reducing agent is present in an amount in the range from about 0.05 to about 10 percent by weight of polymerizable adhesive composition.

15. An adhesive system according to claim 13 wherein said bonding accelerator contains from about 0.05 to about 50 percent by weight of at least one organic polymer film-forming binder material selected from the group consisting of saturated organic polymeric composition having a glass transition temperature in the range from about 0° C. to about 150° C. and polymer-in-monomer syrup, said polymer-in-monomer syrup consisting essentially of
(i) from about 2 to about 60 percent by weight of at least one addition polymer;
(ii) from about 10 to about 98 percent by weight of at least one polymerizable olefinically unsaturated compound having at least one $>C=C<$ group; and
(iii) from zero to about 30 percent by weight of a polymer containing the group $(CH_2CCl=CH-CH_2)_n$, wherein n is an integer;
wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weight of (i), (ii) and (iii); and
the carrier vehicle being capable of maintaining said oxidizing agent, said phosphorus-containing compound and said film-forming binder material as a stable solution or dispersion.

16. An adhesive system according to claim 15 wherein said reducing agent is present in an amount in the range from about 0.05 to about 10 percent by weight of polymerizable adhesive composition.

17. A room temperature-curable adhesive system comprising
AA. as a polymerizable adhesive composition, a mixture of
(a) from about 1 to about 30 percent by weight of at least one elastomeric polymeric material selected from the group consisting of polybutadiene homopolymer; copolymer of butadiene and at least one monomer copolymerizable therewith selected from the group consisting of styrene, acrylonitrile, methacrylonitrile and mixtures thereof; modified polymeric material selected from the group consisting of polybutadiene homopolymer and copolymer of butadiene as previously defined, which homopolymer and copolymer having been modified by copolymerization therein of trace amounts up to about 5 percent by weight, based on weight of elastomeric material of at least one functional monomer;
(b) from about 25 to about 85 percent by weight of at least one polymerizable acrylic or substituted acrylic monomer;
(c) from zero to about 50 percent by weight of at least one polymerizable olefinically unsaturated non-acrylic monomer;
(d) from zero to about 60 percent by weight of at least one polymeric material having an intrinsic viscosity in the range from about 0.1 to about 1.3 derived from at least one of said (b) and (c) monomers;
the amounts of (a)–(d) being based on total weight of (a)–(d);

(e) an effective amount of at least one phosphorous-containing compound having the formulae

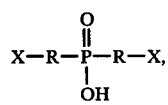   I.

wherein each R is the same or different, and each R is independently a divalent organic radical directly bonded to the phosphorous atom through a carbon-phosphorous bond, said divalent radical being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus; and wherein each X is the same or different, and each X is independently a functional group selected from the class consisting of hydrogen, hydroxyl, amino, mercapto, halogen and $CH{=}C{<}$;

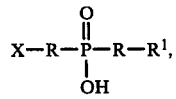   II.

wherein R and X are as previously defined; and $R^1$ is hydrogen or $-R^2-X$, wherein $R^2$ is a divalent organic radical directly bonded to the oxygen radical through a carbon-oxygen bond, said divalent readical $R^2$ being selected from the group consisting of divalent unsubstituted organic radical and divalent organic radical having at least one substitutent group selected from the class consisting of halogen, hydroxyl, amino, alkyl radical containing from 1 to 8 carbon atoms and aryl radical having at least one moiety containing at least one aromatic nucleus and X is as previously defined; and

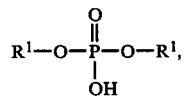

wherein $R^1$ is as previously described;
(f) an effective amount of at least one reducing agent;
(g) from zero to about 10 percent by weight of polymerizable adhesive composition of at least one tertiary amine having the formula

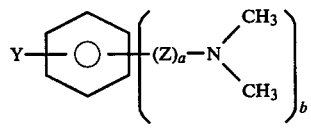

wherein Z is methylene; Y is selected from the group consisting of hydrogen, hydroxy, amino, halogen, alkyl radical having from 1 to 8 carbon atoms; a is zero or 1; and b is 1 or 2;
(h) from zero to about 15 percent by weight of polymerizable adhesive composition of a mixture of a metal molybdate selected from the group consisting of zinc molybdate, calcium molybdate, barium molybdate, strontium molybdate and mixtures thereof, and a metal phosphate selected from the group consisting of zinc phosphate, calcium phosphate, magnesium phosphate and mixtures thereof; said metal molybdate being present on a volume concentration basis of from about 2 to about 3 parts per part of said metal phosphate; and
(i) from zero to about 15 percent by weight of polymerizable adhesive composition of at least one compound selected from the group consisting of polybasic lead salts of phosphosous acid; polybasic lead salts of saturated organic dicarboxylic acids and acid anhydrides, zinc oxide, and mixtures thereof;
the amount of (a)-(e), in percent by weight, being 100 minus the combined amounts of (f)-(i), in percent by weight; and
AB. as a bonding accelerator, an effective amount of at least one oxidizing agent, said oxidizing agent being reactive at room temperature with said reducing agent to generate free radicals effective to initiate addition polymerization of said polymerizable adhesive composition;
said polymerizable adhesive composition being characterized by the substantial absence of free organic and inorganic acid compounds, except for the trace amount of carboxyl values which may be interpolymerized in said modified butadiene-based elastomeric polymeric material and the acid values of the phosphorous-containing compound.

18. An adhesive system according to claim 17 wherein said bonding accelerator contains from about 0.05 to about 50 percent by weight of at least one organic polymer film-forming binder material selected from the group consisting of saturated organic polymeric composition having a glass transition temperature in the range from about 0° C. to about 150° C. and polymer-in-monomer syrup said polymer-in-monomer syrup consisting essentially of
(i) from about 2 to about 60 percent by weight of at least one addition polymer;
(ii) from about 10 to about 98 percent by weight of at least one polymerizable olefinically unsaturated compound having at least one $>C{=}C<$ group; and
(iii) from zero to about 30 percent by weight of a polymer containing the group $(CH_2CCl{=}CH-CH_2)_n$, wherein n is an integer;
wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weigth of (i), (ii) and (iii); and from about 40 to about 99 percent by weight of a carrier vehicle comprising at least one inert organic diluent, said carrier vehicle being capable of maintaining said oxidizing agent and said film-forming binder material as a stable solution or dispersion.

19. A room temperature-curable adhesive system comprising

AA. as a polymerizable adhesive composition, a mixture of
- (a) from about 1 to about 30 percent by weight of at least one elastomeric polymeric material selected from the group consisting of polybutadiene homopolymer; copolymer of butadiene and at least one monomer copolymerizable therewith selected from the group consisiting of styrene, acrylonitrile, methacrylonitrile and mixtures thereof; modified polymeric material selected from the group consisting of polybutadiene homopolymer and copolymer of butadiene as previously defined, which homopolymer and copolymer having been modified by copolymerization therein of trace amounts up to about 5 percent by weight, based on weight of elastomeric material, of at least one functional monomer;
- (b) from about 25 to about 85 percent by weight of at least one polymerizable acrylic or substituted acrylic monomer;
- (c) from zero to about 50 percent by weight of at least one polymerizable olefinically unsaturated non-acrylic monomer;
- (d) from zero to about 60 percent by weight of at least one polymeric material having an intrinsic viscosity in the range from about 0.1 to about 1.3 derived from at least one of said (b) and (c) monomers;

the amounts of (a)-(d) being based on total weight of (a)-(d);
- (l) an effective amount of at least one reducing agent;
- (f) from zero to about 15 percent by weight of polymerizable adhesive composition of a mixture of a metal molybdate selected from the group consisting of zinc molybdate, calcium molybdate, barium molybdate, strontium molybdate and mixtures thereof and a metal phosphate selected from the group consisting of zinc phosphate, calcium phosphate, magnesium phosphate and mixtures thereof; said metal molybdate being present on a volume concentration basis of from about 2 to about 3 parts per part of said metal phosphate; and
- (g) from zero to about 15 percent by weight of polymerizable adhesive composition of at least one compound selected from the group consisting of polybasic lead salts of phosphosous acid, polybasic lead salts of saturated organic dicarboxylic acids and acid anhydrides, polybasic lead salts of unsaturated organic dicarboxylic acids and acid anhydrides, zinc oxide, and mixtures thereof;

the amount of (a)-(d), in percent by weight, being 100 minus the combined amount, in total percent by weight, of (e)-(g); and AB. as a bonding accelerator, an admixture comprising
- (a) from about 0.5 to about 30 percent by weight of at least one oxidizing agent, said oxidizing agent being reactive at room temperature with said reducing agent to generate free radicals effective to initiate addition polymerization of said polymerizable adhesive composition;
- (b) an effective amount of at least one phosphorous-containing compound having the formulae

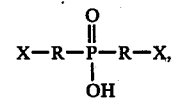

wherein each R is the same or different, and each R is independently a divalent organic radical directly bonded to the phosphorous atom through a carbon-phosphorous bond, said divalent radical being selected from the group consisting of divalent unsubstituted organic radical and divalent organic radical having at least one substituent group selected from the class consisting of halogen, hydroxyl, amino, alkyl radical containing from 1 to 8 carbon atoms and aryl radical having at least one moiety containing at least one aromatic nucleus; and wherein each X is the same or different, and each X is independently a functional group selected from the class consisting of hydrogen, hydroxyl, amino, mercapto, halogen and $CH{=\!=}C{<}$;

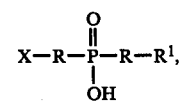

wherein R and X are as previously defined; and $R^1$ is hydrogen or $—R^2—X$, wherein $R^2$ is a divalent organic radical directly bonded to the oxygen radical through a carbon-oxygen bond, said divalent readical $R^2$ being selected from the group consisting of divalent unsubstituted organic radical and divalent organic radical having at least one substitutent group selected from the class consisting of halogen, hydroxyl, amino, alkyl radical containing from 1 to 8 carbon atoms and aryl radical having at least one moiety containing at least one aromatic nucleus and X is as previously defined; and

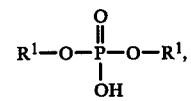

wherein $R^1$ is as previously described;
- (c) from zero to about 5 percent by weight of at least one free radical scavenger; and
- (d) from about 40 to about 99 percent by weight of a carrier vehicle comprising at least one inert organic diluent, said carrier vehicle being capable of maintaining said oxidizing agent and said phosphorous-containing compound as a stable solution or dispersion;

said polymerizable adhesive composition being characterized by the substantial absence of free organic and inorganic acid compounds, except for the trace amount of carboxyl values which may be interpolymerized in said modified butadiene-based elastomeric polymeric material and the acid values of the phosphosus-containing compound.

20. An adhesive system according to claim 19 wherein said bonding accelerator contains from about 0.05 to about 50 percent by weight of at least one organic polymeric film-forming binder material selected from the group consisting of saturated organic polymeric composition having a glass transition temperature in the range from about 0° C. to about 150° C. and polymer-in-monomer syrup consisting essentially of (i) from about 2 to about 60 percent by weight of at least one addition polymer;

(ii) from about 10 to about 98 percent by weight of at least one polymerizable olefinically unsaturated compound having at least one $>C=C<$ group; and (iii) from zero to about 30 percent by weight of a polymer containg the group $(CH_2CCl=CH-CH_2)_n$, wherein n is an integer;

wherein (i) and (ii) are present as a partial polymerization product of (ii) or of (ii) in the presence of (iii), the mixture of (i) and (ii) or of (i), (ii) and (iii) being a syrup of polymeric materials dissolved or dispersed in monomer, in which syrup the amount of (i) derived from (ii) is in the range from about 2 to about 90 percent by weight, based on the total weight of (i), (ii) and (iii); and from about 40 to about 99 percent by weight of a carrier vehicle comprising at least one inert organic diluent, said carrier vehicle being capable of maintaining said oxidizing agent and said film-forming binder material as a stable solution or dispersion.

* * * * *